Patented Mar. 30, 1926.

1,578,325

UNITED STATES PATENT OFFICE.

WILLY KUNZE, OF BREMEN, GERMANY.

METHOD AND DEVICE FOR DETERMINING THE DIRECTION OF SOUND.

Application filed September 20, 1921. Serial No. 502,014.

*To all whom it may concern:*

Be it known that I, WILLY KUNZE, a citizen of the German Republic, residing at Bremen, Germany, have invented certain new and useful Improvements in Methods and Devices for Determining the Direction of Sound, of which the following is a specification.

In the well known binaural method for the determination of the direction of sound waves two receivers are used which are arranged at a determined distance the one from the other (forming a base line) and are connected with the ears of the attendant by absolutely separated leads. The impression of direction which the attendant perceives at the hearing is produced by the time-difference which, at the lateral situation of the source of sound, exists between the arrival of the sound in the one and in the other receiver. As the same time-difference exists when the sound arrives at a certain angle from the front or at the same angle from the back, there will be in each case an ambiguity. To avoid this ambiguity a second base line is used which forms with the first base line an angle of 90°. With the aid of these two base lines it is possible to determine the direction without ambiguity.

Figure 1:
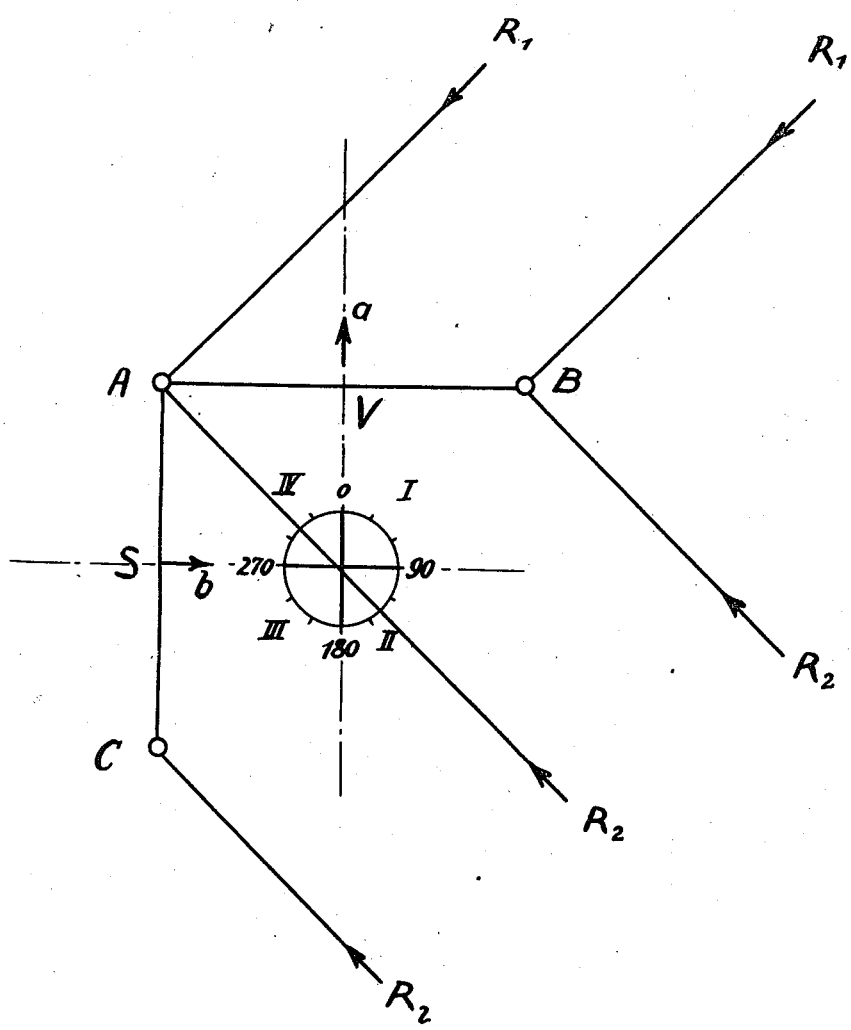
Figure 2:
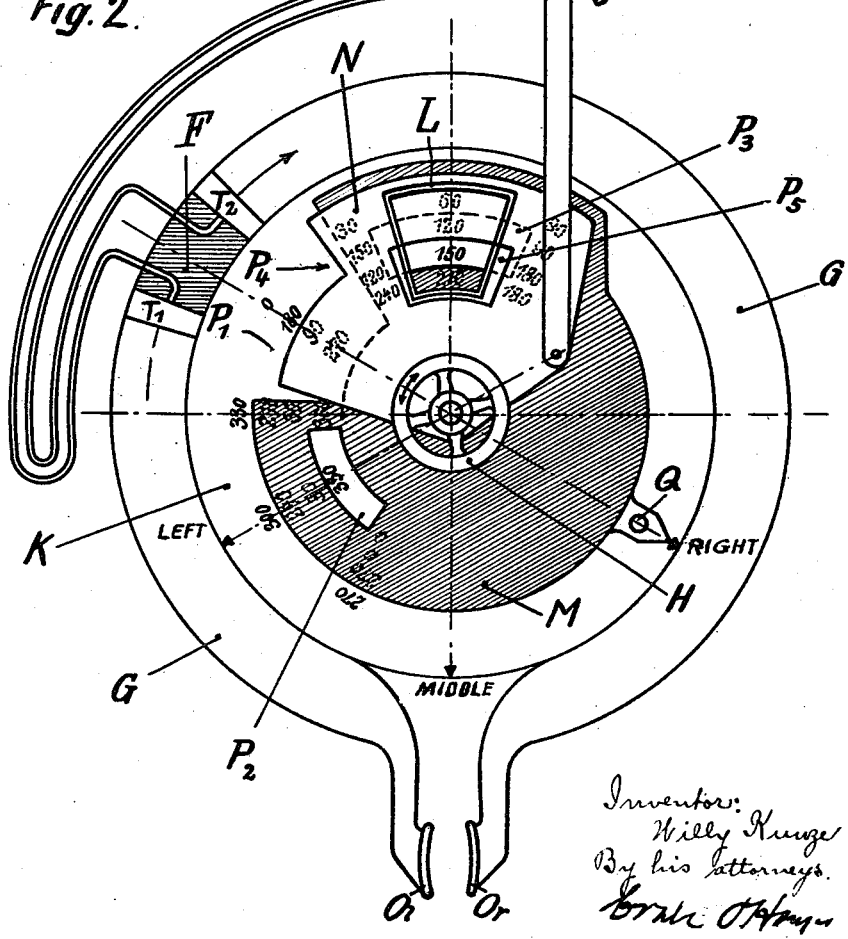

For explaining this known method two measuring base lines V and S are shown on Fig. 1 of the drawing which are formed by the receivers A, B and C and which form an angle of 90°. Figure 2 shows by way of example the device for the application of the method according to this invention.

The receiver A is common to the two base lines. A is connected with the left ear of the operator and B or C is connected with the right ear so that for the base line V the arrow $a$ and for the base line S the arrow $b$ indicates the straight direction. If now sound waves come from the direction $R_1$ the observer will have the impression, when he uses the base line V, as if the source of sound were situated 45° forward at the right. He would have the same impression if the sound waves came from the direction $R_2$ as in this case the time-difference between the arrival of the sound waves at A and B is exactly the same. The operator can therefore state with certainty only that the sound arrives at a determined angle from the right, it being however doubtful whether it comes from the front or from the back.

If now the base line S is used the observer will at once be able to clear up this doubt as, when the sound comes really from the direction $R_1$, he will now receive a left hand side impression as in this case the receiver A connected with the left ear will be excited before the receiver C which is connected with the right ear. Inversely the observer must receive a right hand side impression in using the base line S when the sound comes from the direction $R_2$. In this manner it will be possible to determine, without difficulty, the quadrant from which the sound waves come.

The exact direction in degrees is determined, in a manner which is also known, by compensating the time-difference which exists in the receivers at the arrival of the sound waves by means of the insertion of intermediary sound paths of variable length between the receiver and the ears of the observer. The time difference is compensated if the operator has the impression as if the source of sound were situated in the middle plane, straight out in front or at the back (middle impression). The length of the sound path necessary for the compensation is directly a measure for the true direction of the sound.

With the apparatus which have been used hitherto for this purpose the procedure is as follows:—

At first the one base line is used for observation and the time difference is compensated by making longer the path for the sound between the receiver which has been excited first and the ear or by shortening the sound path between the receiver which has been excited last and the ear, or both simultaneously, until the middle impression is received. With this object in view the compensating device is moved from the zero position in which both sound paths between the receivers and the ears are of equal lengths, in the one or in the other direction of movement according to whether right hand side impression or left hand side impression has been received at the zero position. This movement is utilized at the same time to operate a selecting mechanism of convenient construction which at the transition to the second measuring base line throws in that scale upon which the correct result is marked and throws out all the other scales which are not valid in this case so that without any mental effort of the operator the ambiguity is removed, and so that only the true direction can be read.

This invention consists in an improved selecting system, which is based upon the knowledge that at the observation with the first base line no compensation of the sound paths is required, and that the decision, how the scales have to be selected, is given already by the fact that at the zero position of the compensating device a right impression or a left impression are produced.

The characteristic feature of the invention consists in this that, according to whether at the hearing with the first base line a right impression or a left impression is produced at the zero position of the compensating device, a selecting mechanism is thrown in or out so that, at the transition to the second base line, automatically only that scale appears which contains without ambiguity the correct result. The selecting mechanism is operated by a separate manipulation without adjustment of the compensating device.

The advantage of this method over the known methods consists in the suppression of a positive connection between the compensating apparatus and the scale diaphragms, whereby the construction of the device is greatly simplified. The compensating apparatus remains further in the zero position so that, even after the reversing upon the second base line, the operator can find subjectively at once the correct way. Any positive connection between the selecting mechanism and the compensating apparatus is suppressed. The selecting mechanism is for instance operated by a switch or slide which preferably has to be pushed to the right at right impression and to the left at left impression and which selects the correct scales owing to its shape.

In the form of construction shown in Fig. 2, A, B, and C are three electric sound receivers, two of which are always cut in simultaneously at the measuring, either A and B or A and C. A and B form the forward base line V, A and C form the lateral base line S. A is fed from the battery $E_1$, B or C from the battery $E_2$. The reversing from V on S is effected by the base line switch D. Receiver A acts across the induction coil $J_1$ upon the telephone $T_1$ whilst B or C acts upon the telephone $T_2$ across the coil $J_2$.

The two telephones are fixed with their backs upon a carriage F which is adapted to slide sound proof in a tube or channel G and which is operated by the hand wheel H. The channel terminates in the ear pieces $O_1$ and $O_r$, which are held directly or with interposition of tubes to the left and right ear of the operator. The sound which comes from the telephone $T_1$ can therefore get only to the left ear and the sound which comes from the telephone $T_2$ can get only to the right ear, or otherwise expressed the sound received in the receiver A acts upon the left ear and the sound received in the receiver B or C acts upon the right ear of the operator. Upon the axle of the hand wheel H, by means of which the telephone carriage F is moved in channel G, a scale disk K with four scales is arranged which moves with said telephone carriage and which is marked with the degree-figures for the directions of sound. The whole scale is covered by a protecting plate (not shown in the drawing) in which a window L is arranged (indicated on the figure by double lines) through which part of the scale is visible for reading. Two diaphragms M and N are arranged between the scale and the cover plate which do not move when the hand wheel is being revolved. The lower diaphragm M is reduced in diameter for a portion of its circumference to form an exposure so as to uncover the surface below it as at $P_1$ and also as $P_2$, $P_3$. With the aid of the handle Q of the indicator hand this lower diaphragm M can be turned into the positions "right" "left" or "middle." In the position "middle" the diaphragm uncovers the whole window L whilst at the position "right" (which position is shown on the figure) only the two middle scales, and at the position "left" only the inner and the outer scales are visible in the window. The diaphragm N is connected by the articulated levers U with the switch D and it is reduced in diameter for a portion of its circumference to form an exposure so as to uncover the surface below it as at $P_4$ and has a slot $P_5$. When the forward base line is inserted this diaphragm uncovers merely the two outer scales whilst, when the lateral base line is inserted, only the two inner scales are visible.

The operation of the device is as follows:—Either base line is switched in and the compensator is brought to the zero position so that the sound paths $T_1$, $O_1$ and $T_2$ $O_r$ are of equal length. The diaphragm M is adjusted to "middle." In the window L appear the specially marked degree figures 0 and 180 if the switch stands upon forward base line, and 90 and 270 if the switch stands on lateral base line. According to whether at the hearing in this position a right or left-direction impression is received the hand Q is turned to the position "right" or "left," whereupon the switch is switched over to the other base line and the hand wheel is revolved until the middle impression is received at which moment the sound direction can be read in the window without ambiguity.

In the adjustment shown in Fig. 2 the apparatus has been adjusted to indicate that the sound strikes the receivers at an angle of 150 degrees to the base line A, B. To determine this angle the method is as follows: The handle H is first turned to make the paths $T_1$, $O_1$ and $T_2$ $O_r$ equal and the ears are applied to the earpieces $O_1$ and $O_r$. The switch D is then turned so as to connect with the receiver B and thus utilize the base line A, B. The diaphragm M is turned by the handle Q so that its pointer points to M, or the "middle" position, and the two figures O and 180 on the indicator disk K will appear at the window L. The figures on disk K will appear because portions of disks M and N are cut away as at $P_1$ and $P_4$, and these sectors $P_1$ and $P_4$ are then in register with the window L. Suppose when the apparatus is in this position (which may be called its zero or normal position) the sound appears to come from the right: The operator begins his observation and by means of the handle Q turns the diaphragm M so that the pointer points to the position "right". The outer figure O on the scale will then be covered by the diaphragm M and 180 will remain. The operator then turns the switch D into the position shown in the drawing to utilize the base line A, C, thus also turning the diaphragm N so that now the figure 90 of the scale on K is visible through the opening 1. In this case the sound will still appear to come from the right so that to receive the middle impression the passage from the right side telephone must be lengthened by turning the hand wheel H and the scale disk K. When the central impression is gained by this final adjustment the figure 150 will appear at the window L.

The construction shown on Fig. 2 is given evidently only by way of example. The same idea can be carried out also by means of other constructions. It is for instance not necessary that by the rotation of the hand Q the diaphragm M be moved directly. This hand could operate a control device in such a manner that the adjusting of the diaphragm itself is effected only by the operation of the base switch.

It is further not necessary to place the hand at the beginning of the measuring upon "middle" as it can remain in any position.

All what has been hereinbefore said with regard to the form of construction shown with two measuring bases relates obviously also to a device comprising more than two measuring bases.

I claim:—

1. A method for determining without ambiguity the direction in apparatuses working according to the binaural hearing method with the use of several measuring bases standing at an angle the one to the other consisting in adjusting at the measuring with the first basis, the distances between the two receivers and the ears of the operator to the same length and not altering the same, and in further operating a selecting mechanism, according to whether at this zero position the source of sound is perceived as being situated at the right or at the left of the straight direction, without alteration of the sound paths, so that at the reversing upon the second basis only that scale becomes visible upon which the correct measuring result is indicated and altering the length of the sound paths whereby the listener at the ear pieces will receive the middle impression binaurally.

2. In a device for determining the direction from which sound proceeds, in combination, two receivers, two telephones, an indicating disk connected to said telephones to move therewith and provided with four scales, a compensating device adapted to cooperate with said telephones, a directive selecting mechanism consisting of a disk having an exposure adapted to uncover all said four scales of said indicating disk and in addition having two slots one on each side of said exposure one of which is adapted to show the outer and inner scales of said indicating disk, the other of said slots being adapted to show the two middle scales thereof.

3. In a device for determining the direction of sounds, in combination, three receivers and two telephones, one of said telephones being permanently connected to one of said receivers and the other of said telephones being connected to either of the other receivers at will, a compensating device operatively connected to said telephones, an indicating disk provided with four scales and connected to said telephones to move therewith, a selecting mechanism consisting of a disk having an exposure adapted to uncover the four scales of said indicating disk and having also two slots, one at each side of said exposure which cooperate with said disk to expose the outer and inner or the two middle scales, and a second diaphragm located over said first diaphragm and having two slots which expose only the inner or outer of said scales selected by the first diaphragm, and a switch connected to said second diaphragm to move it and adapted to connect either of said receivers to said temporarily-connectable telephone.

In testimony whereof I affix my signature.

WILLY KUNZE.